(12) United States Patent
Hsu et al.

(10) Patent No.: US 12,449,673 B1
(45) Date of Patent: Oct. 21, 2025

(54) BALL BEARING SENSOR SHIFT CAMERA WITH FLEXURE

(71) Applicant: Apple Inc., Cupertino, CA (US)

(72) Inventors: Ya-Wen Hsu, San Francisco, CA (US); Aurelien R Hubert, San Jose, CA (US); Jinjun Zhang, San Jose, CA (US); Yazan Z Alnahhas, Stanford, CA (US); Kevin Garrison, Santa Clara, CA (US); Nitin Kumar Chennupati, Mountain View, CA (US); Nicole Elizabeth Cazares, Yongsan-gu (KR)

(73) Assignee: Apple Inc., Cupertino, CA (US)

( * ) Notice: Subject to any disclaimer, the term of this patent is extended or adjusted under 35 U.S.C. 154(b) by 207 days.

(21) Appl. No.: 18/478,041

(22) Filed: Sep. 29, 2023

Related U.S. Application Data

(60) Provisional application No. 63/582,219, filed on Sep. 12, 2023.

(51) Int. Cl.
  *G02B 27/64* (2006.01)
  *G03B 30/00* (2021.01)
  *H04N 23/68* (2023.01)

(52) U.S. Cl.
  CPC .......... *G02B 27/646* (2013.01); *G03B 30/00* (2021.01); *H04N 23/687* (2023.01)

(58) Field of Classification Search
  CPC ..... G02B 27/646; G03B 30/00; H04N 23/687
  See application file for complete search history.

(56) References Cited

U.S. PATENT DOCUMENTS

| | | | | |
|---|---|---|---|---|
| 8,548,313 | B2* | 10/2013 | Krueger | H04N 23/6812 |
| | | | | 396/7 |
| 11,743,586 | B2* | 8/2023 | Smyth | G03B 30/00 |
| | | | | 348/208.11 |
| 12,219,255 | B1* | 2/2025 | Xu | H04N 23/54 |
| 2014/0028846 | A1* | 1/2014 | Krueger | H04N 23/51 |
| | | | | 348/144 |
| 2018/0115689 | A1* | 4/2018 | Lin | G02B 7/09 |
| 2022/0014677 | A1* | 1/2022 | Smyth | H04N 23/55 |
| 2023/0114004 | A1* | 4/2023 | Gurevich | H04N 23/671 |
| | | | | 235/454 |
| 2023/0161227 | A1* | 5/2023 | Kim | G03B 17/17 |
| | | | | 396/55 |
| 2023/0385576 | A1* | 11/2023 | Gurevich | G02B 7/28 |
| 2024/0397180 | A1* | 11/2024 | Yedid | G02B 27/646 |

* cited by examiner

*Primary Examiner* — Chiawei Chen
(74) *Attorney, Agent, or Firm* — Robert C. Kowert; Kowert, Hood, Munyon, Rankin & Goetzel, P.C.

(57) ABSTRACT

Various embodiments include a camera having a ball bearing voice coil motor (VCM) actuator for moving a carrier (and image sensor) and a flexure to supply a drive current to the ball bearing VCM actuator, allowing motion of the carrier relative to a stationary structure of the camera while maintaining an electrical connection. In embodiments, the camera may include a shield can coupled to a lens barrel (e.g., forming a seal to block particles and/or light), and the carrier is coupled with the image sensor. The ball bearing VCM actuator may include a coil coupled with the carrier, a magnet coupled with the shield can, and a ball bearing suspension arrangement to suspend the carrier from the shield can.

20 Claims, 12 Drawing Sheets

BALL BEARING SENSOR SHIFT CAMERA WITH FLEXURE

PRIORITY APPLICATION

This application claims benefit of priority to U.S. Provisional Application Ser. No. 63/582,219, entitled "Ball Bearing Sensor Shift Camera with Flexure," filed Sep. 12, 2023, and which is hereby incorporated herein by reference in its entirety.

BACKGROUND

Technical Field

This disclosure relates generally to architecture for a camera having a ball bearing actuator for moving an image sensor and a flexure to supply a drive current to the ball bearing actuator.

Description of the Related Art

The advent of small, mobile multipurpose devices such as smartphones and tablet or pad devices has resulted in a need for high-resolution, small form factor cameras for integration in the devices. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved along the optical axis of the camera to refocus the camera.

Figure 1A:
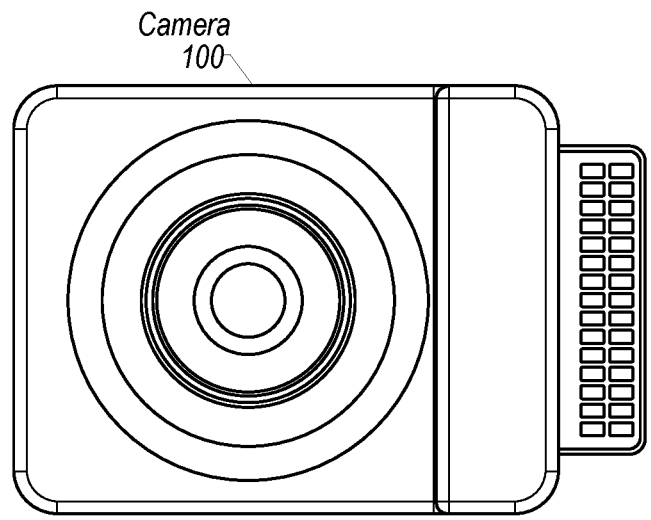
FIG. 1A illustrates a schematic top view of an example camera having a ball bearing actuator for moving an image sensor and a flexure to supply a drive current to the ball bearing actuator, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Some embodiments include a camera having a sensor shift actuator for moving an image sensor (e.g., a ball bearing sensor shift actuator) and a flexure to supply a drive current to the ball bearing actuator. In some embodiments, the sensor shift actuator may move the image sensor, relative to a lens barrel, in a direction parallel to the optical axis, e.g., to provide focus and/or autofocus (AF) functionality. In some embodiments, the sensor shift actuator may also move the image sensor in multiple directions relative to the lens barrel (e.g., moving the image sensor in directions orthogonal to an optical axis of the camera in order to provide optical image stabilization functionality).

According to some embodiments, one or more suspension arrangements (e.g., bearing suspension arrangement(s), flexure suspension arrangement(s), etc.) may suspend a carrier (e.g., a moveable frame), which includes the image sensor, from a shield can of the camera (e.g., a base structure of the camera). For example, a respective bearing suspension arrangement may include one or more stages configured to move on ball bearings so as to allow motion enabled by the actuator.

In some embodiments, a camera may have an actuator with one or more moving coils and a flexure (e.g., a dynamic flex circuit). For example, the camera may include a movable frame (carrier) that is fixedly coupled with the image sensor. The actuator may be a ball bearing voice coil motor (VCM) actuator that moves the movable frame relative to one or more stationary structures of the camera (e.g., relative to a lens barrel that includes one or more lenses, a shield can, or other stationary structure). The VCM actuator may include a coil coupled with the movable frame, such that the coil moves together with the movable frame. Furthermore, the VCM actuator may include a magnet coupled with the stationary structure(s).

The flexure may be configured to provide an electrical connection between the coil and the stationary structure(s). A portion of the flexure may provide sufficient service loop to allow motion of the movable frame enabled by the VCM actuator. The flexure may be configured to convey electrical signals between the stationary structure(s) and the coil via the electrical connection. According to various embodiments, the flexure may include a fixed end portion, a movable end portion, and/or a flexible intermediate portion. The fixed end portion may be fixedly coupled with the stationary structure(s). The movable end portion may be fixedly coupled with the carrier (e.g., any portion/component of the carrier, such as the coil or other portion/component). The flexible intermediate portion may extend from the fixed end portion to the movable end portion and may provide a service loop that allows the motion of the movable frame enabled by the VCM actuator. In embodiments, the flexible portion of the flexure may allow motion of the carrier relative to the stationary structure enabled by the ball bearing VCM actuator while maintaining the electrical connection (the flexure may convey electrical signals between the carrier and the stationary structure via the electrical connection).

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

Figure 1B:
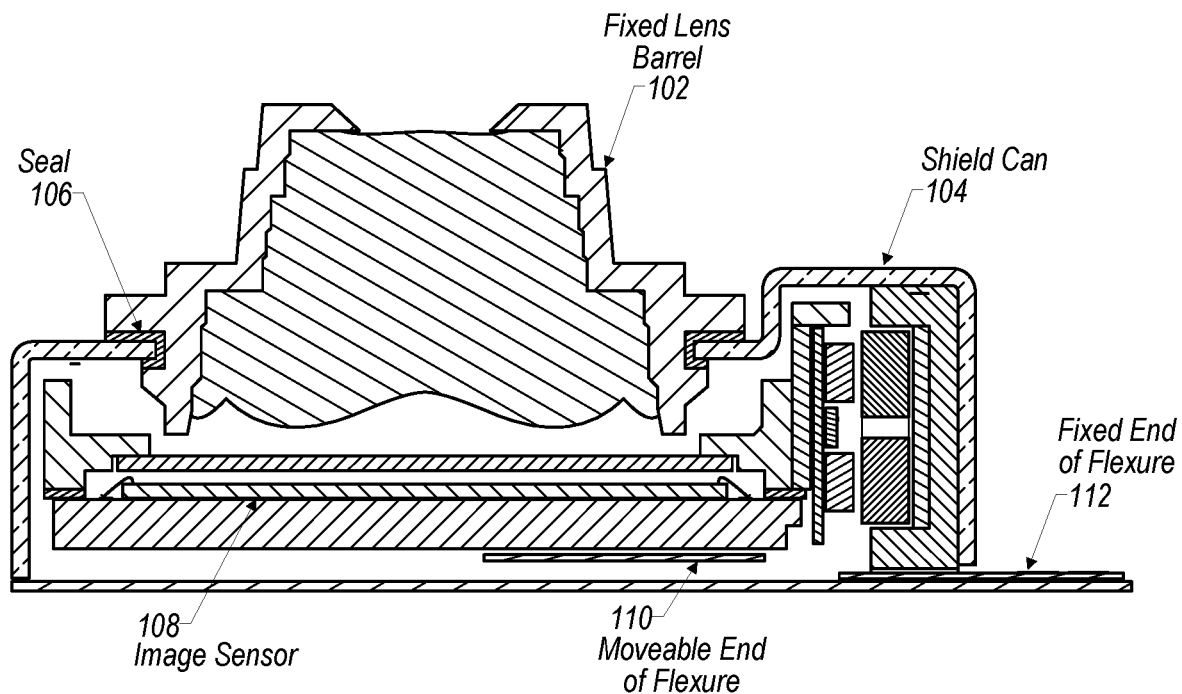
FIG. 1B illustrates a schematic side cross-sectional view of an example camera having a ball bearing actuator for moving an image sensor and a flexure to supply a drive current to the ball bearing actuator, in accordance with some embodiments.

Described herein are embodiments of a camera having a ball bearing actuator for moving an image sensor and a flexure to supply a drive current to the ball bearing actuator. In embodiments, the flexure may also supply current and/or voltage to any number of other components of the camera (e.g., components of a substrate, discussed herein). The arrangements discussed throughout generally comprise a camera having a moveable image sensor, e.g., to provide focus (e.g., autofocus (AF)) during imaging. FIGS. 1A and 1B show an example of such a camera 100.

FIG. 1A illustrates a schematic top view of an example camera having a ball bearing actuator for moving an image sensor and a flexure to supply a drive current to the ball bearing actuator, in accordance with some embodiments. In the depicted embodiment, the side of the camera's shield can that encloses a sensor shift actuator (the right side of the depicted example) extends further away from the camera barrel than an opposite side of the shield can (the left side of the depicted example). This asymmetrical camera design (e.g., asymmetrical with respect to the camera barrel and/or center of the camera barrel/lens) may cause the camera to have a shorter length (e.g., have a smaller footprint), which may allow the camera to fit into a smaller opening of a system and/or take up less space of a system it is installed in. Traditional techniques for designing cameras (e.g., using actuators on each side of the camera) included a symmetrical or more symmetrical camera design, which causes those cameras to have a longer length (e.g., have a larger footprint), which may prevent the camera from fitting into small openings of some systems.

FIG. 1B illustrates a schematic side cross-sectional view of an example camera (e.g., the camera 100 of FIG. 1A) having a ball bearing actuator for moving an image sensor and a flexure to supply a drive current to the ball bearing actuator, in accordance with some embodiments. In various embodiments, the camera may include a fixed lens barrel 102 that is fixedly coupled to a shield can 104 (base structure). In embodiments, a seal 106 is formed between the fixed lens barrel 102 and the shield can 104, such that any number/type of particles and/or light are prevented from passing from outside the seal (e.g., external environment) into the camera.

As shown, the camera includes an image sensor 108 that may be fixedly coupled to a carrier, as discussed in further detail below. The image sensor may capture image data based on light that has passed through one or more lenses within the fixed lens barrel. In embodiments, the one or more lenses define an optical axis. Also depicted are a moveable end 110 of a flexure and a fixed end 112 of a flexure, which is discussed in further detail below.

Figure 4A:
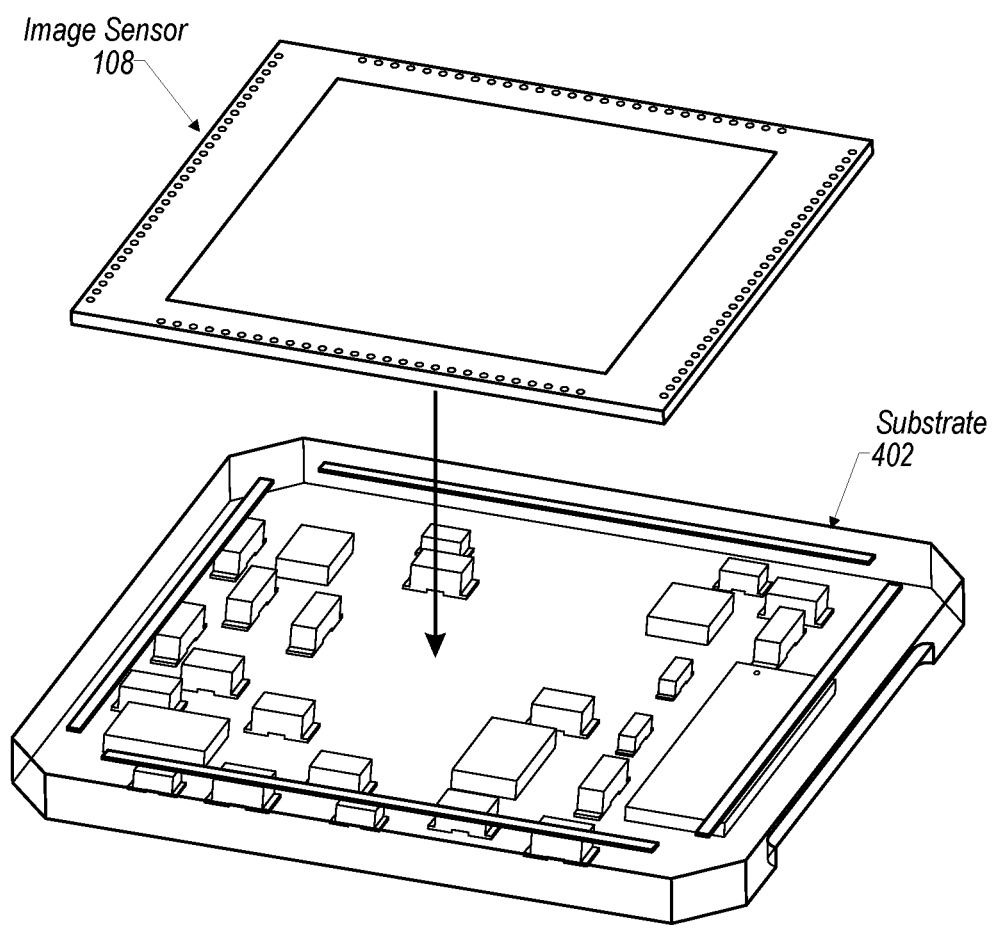
FIG. 4A illustrates a top perspective view of an example image sensor and substrate of a camera configured with a sensor shift actuator, in accordance with some embodiments.
Figure 4B:
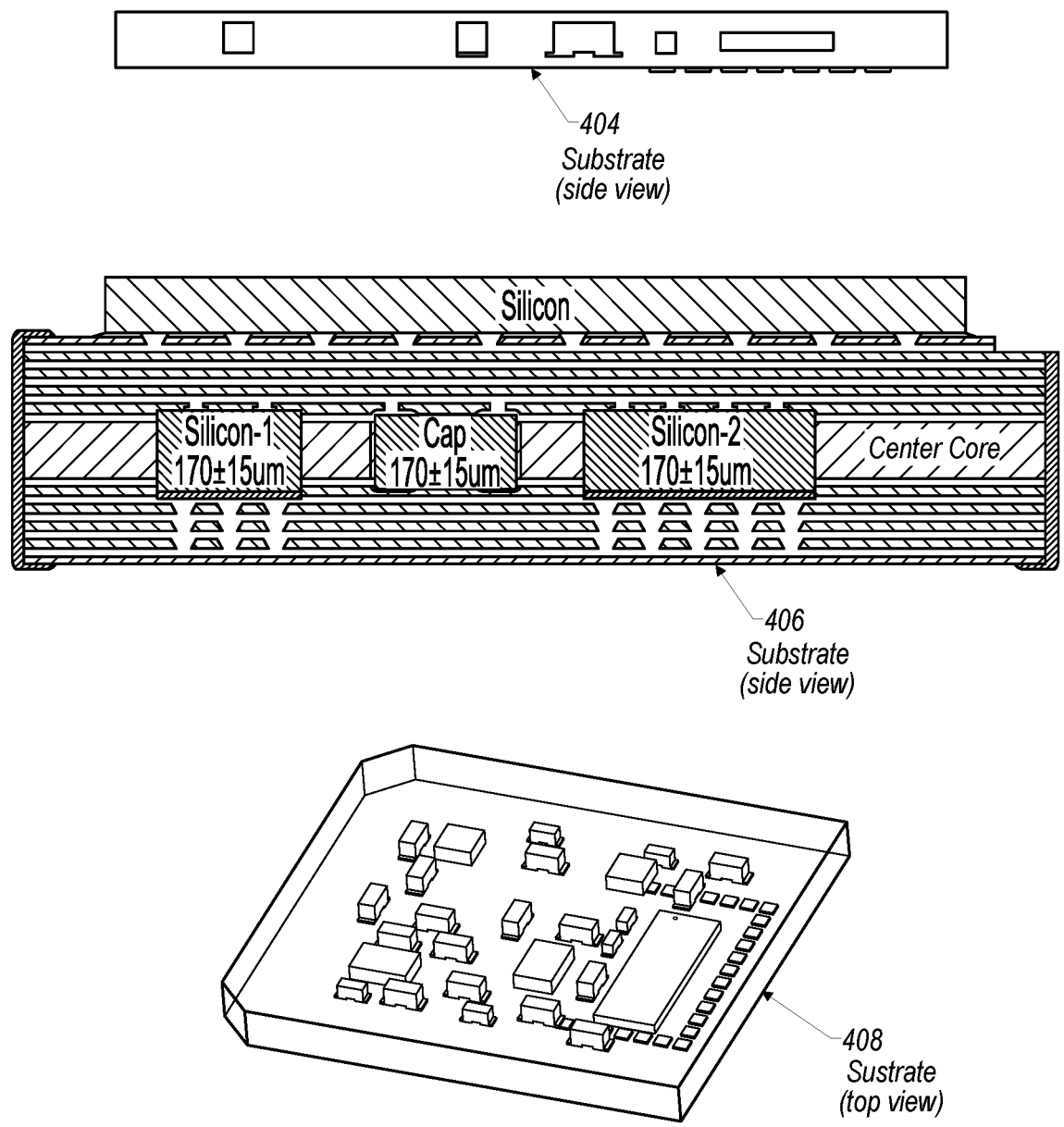
FIG. 4B illustrates side perspective views and a top perspective view of an example substrate of a camera configured with a sensor shift actuator, in accordance with some embodiments.
Figure 4C:
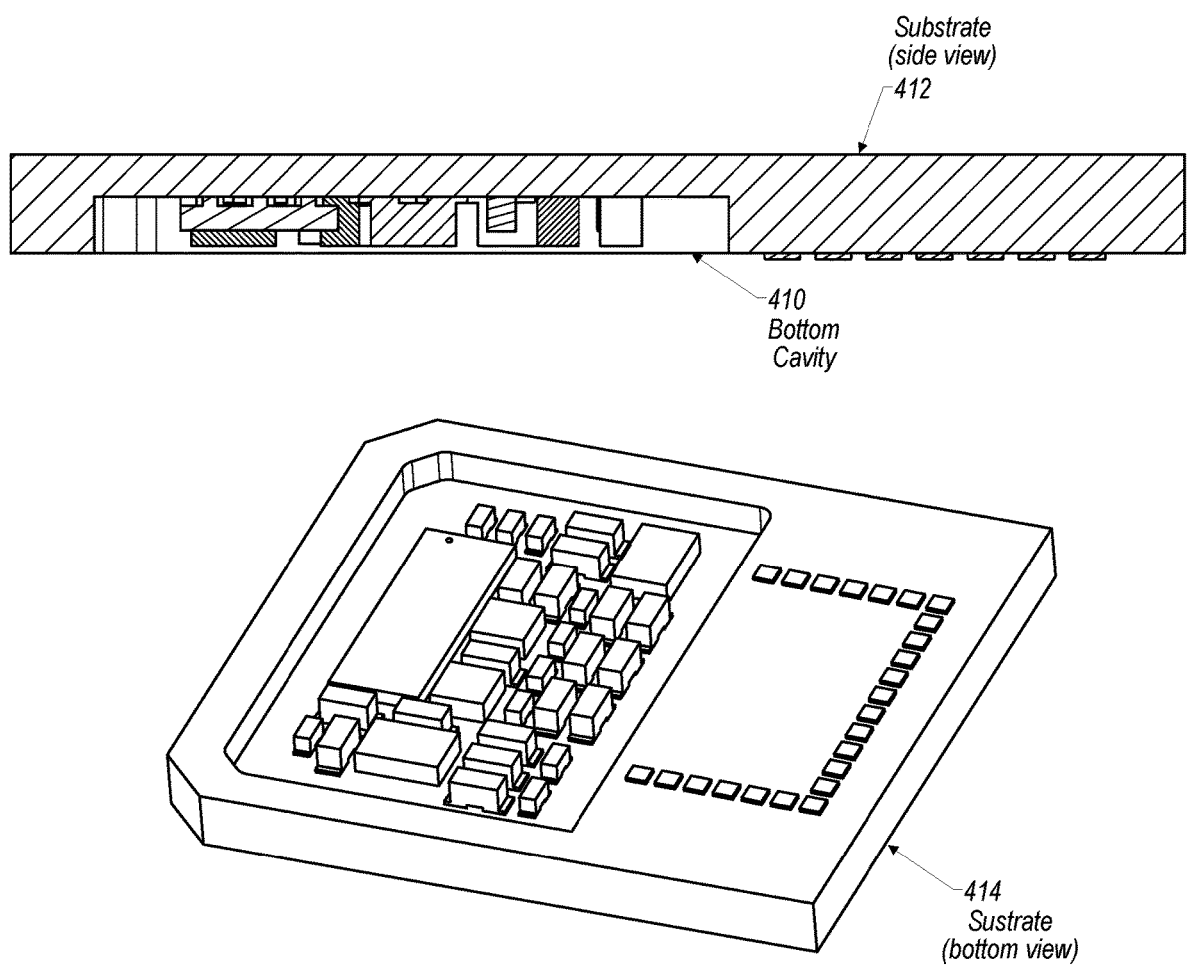
FIG. 4C illustrates a side perspective view and a top perspective view of an example substrate of a camera configured with a sensor shift actuator, in accordance with some embodiments.

In some embodiments, the image sensor 108 may be attached to a substrate, examples of which are discussed in FIGS. 4A-4C. In some embodiments, an image sensor package may include the image sensor, the substrate, a filter (e.g., an infrared cutoff filter (IRCF), and/or one or more circuit layers (e.g., moveable end of flexure 110)). The circuit layer(s) may be used for conveying electrical signals, e.g., between electrical components of the image sensor package 206 (e.g., electrical components of the substrate), and/or between the image sensor package 206 and one or more other portions of the camera (e.g., via an electrical interface between the circuit layer(s) and one or more other circuits). In various embodiments, the image sensor package may be coupled with one or more components of the ball bearing VCM actuator.

Figure 2A:
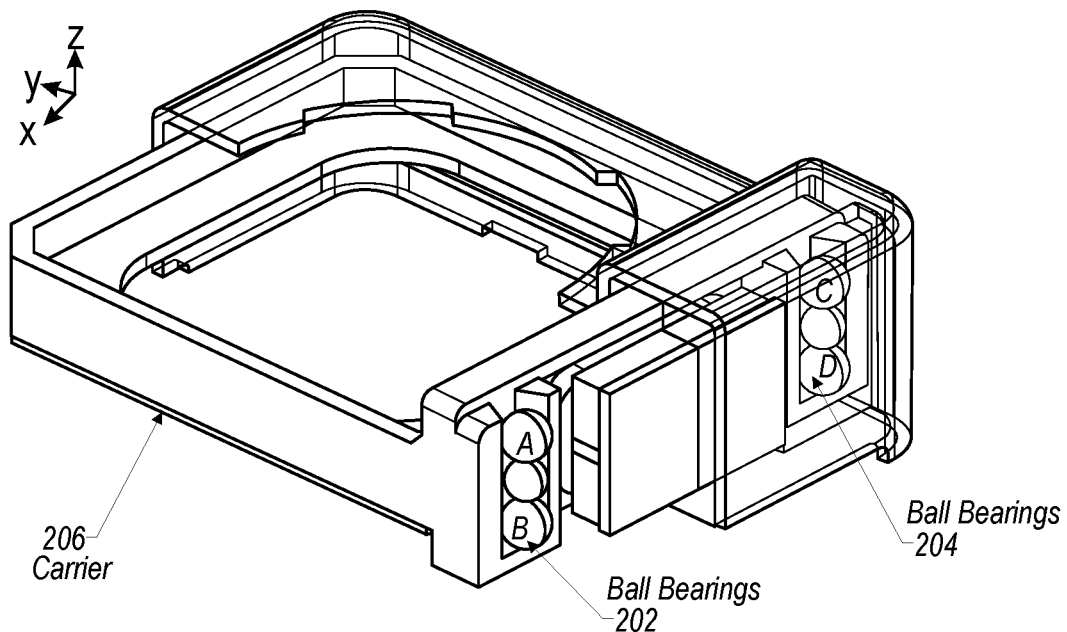
FIG. 2A shows a top perspective view of an example carrier of a camera having a ball bearing actuator, in accordance with some embodiments.

FIG. 2A shows a top perspective view of an example carrier of a camera having a ball bearing actuator, in accordance with some embodiments. In embodiments, a ball bearing suspension arrangement includes a first group of raceways (also referred to as tracks) enclosing a first group of ball bearings 202 and a second group of raceways enclosing a second group of the ball bearings 204. In embodiments, the first group of raceways and ball bearings is located at (or approximately at) a first corner of the carrier, and the second group of raceways and ball bearings is located at (or approximately at) a second corner of the carrier that is adjacent to the first corner of the carrier.

Figure 8A:
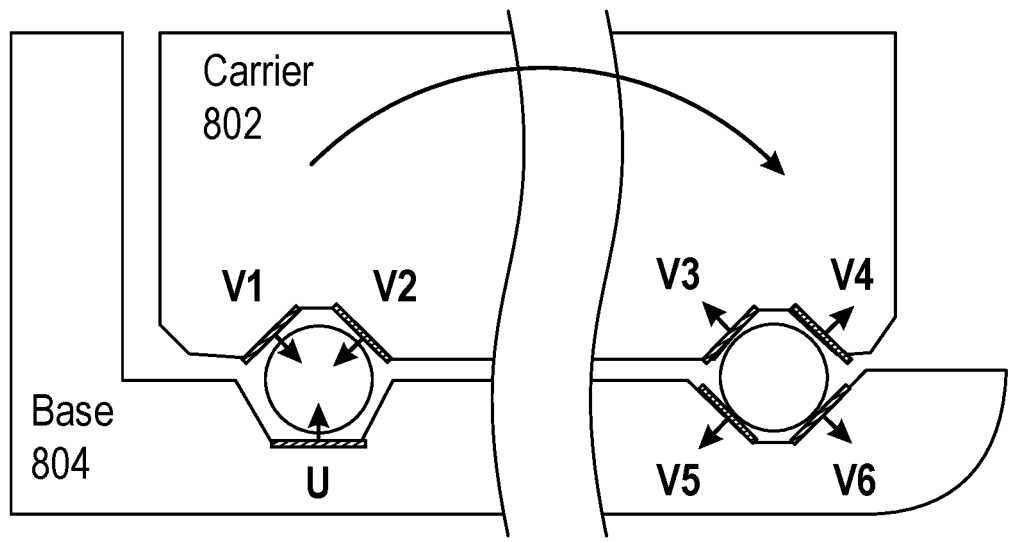
FIG. 8A illustrates a schematic top cross-sectional view of an example bearing suspension arrangement having a first group of raceways directionally biased inwards and a second group of raceways directionally biased outwards, in accordance with some embodiments.

In the depicted example, only the raceways of the carrier 206 are shown; however, embodiments may include any number of other raceways of a base structure that are also part of each group of raceways (as shown in FIG. 8A). Although three ball bearings are shown in each group of the example embodiment, in various embodiments any other number of ball bearings may be used in each group. Although middle ball bearing(s) are smaller in size than the end ball bearings (end ball bearings A, B, C, D) in the example embodiment, in various embodiments any of the ball bearings may be any size (e.g., any give ball bearing may be the same or different in size that any other ball bearing). For example, some embodiments may have the same size for all ball bearings, whereas other may have different sizes for each end ball bearing. Any combination of sizes and/or numbers of ball bearings may be used, in various embodiments.

In embodiments, the bearing suspension arrangement(s) may include one or more ball bearings made of steel, ceramic, etc. In some embodiments, The ball bearing suspension arrangement may include one or more Z-translation ball bearings. While some aspects of the suspension arrangement(s) may be referred to herein in terms of "AF," it should be understood that such aspects may additionally, or alternatively, be referred to in terms of "focus," in some embodiments.

The carrier may be configured to translate in the Z-axis direction, e.g., via the ball bearings disposed between the carrier and a side of the base structure (e.g., shield can or other structure). According to some examples, the Z-axis translation movement may be used to provide AF movement of an image on the image sensor. In some embodiments, the ball bearings may reside within one or more Z-translation tracks defined, e.g., by the carrier and/or the base structure. For example, a particular track may include a group of raceways that enclose a group of ball bearings. Respective ones of the tracks may be oriented in the same direction to allow for constrained movement in a common direction (e.g., in the Z-axis direction). An inner side of the base structure (e.g., shield can of other structure) may be shaped so as to define one or more grooves, recesses, pockets, etc., that at least partially form the Z-translation track(s). Additionally, or alternatively, a side of the first portion of carrier may be shaped so as to define one or more grooves, recesses, pockets, etc., that at least partially form the Z-translation track(s). In some embodiments, the Z-translation ball bearings may be disposed within respective spaces of the Z-translation track(s) that may be sized to accommodate the Z-translation ball bearings between the side of the base structure and the side of the carrier. In some non-limiting embodiments, the Z-translation track(s) may comprise multiple segments (e.g., a group of raceways may form a track).

Figure 2B:
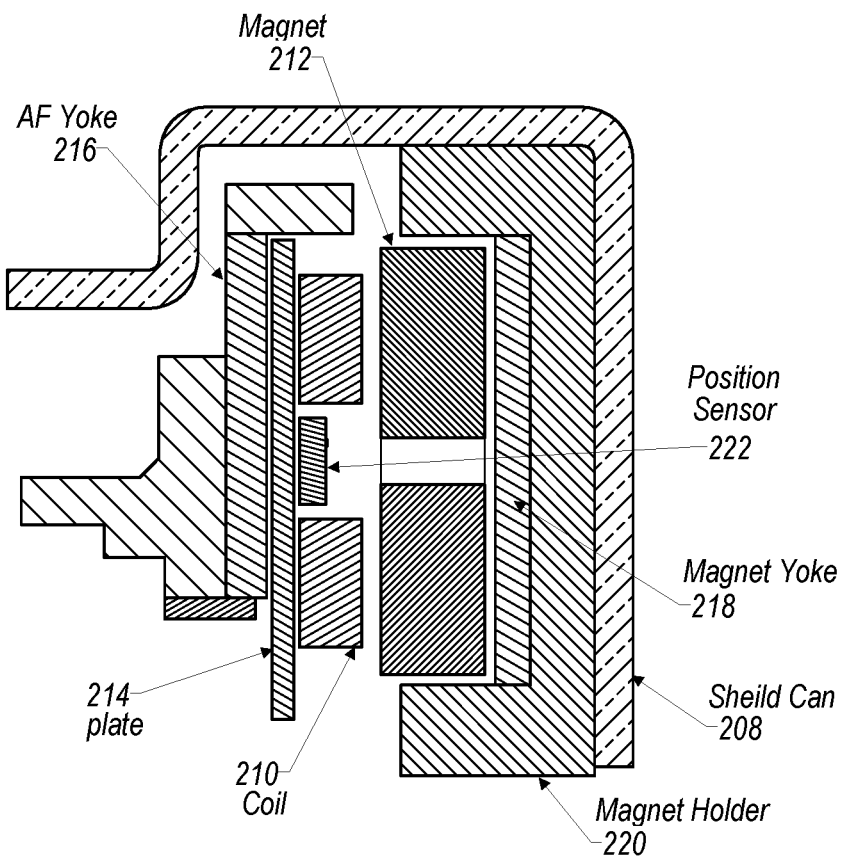
FIG. 2B illustrates a schematic side cross-sectional view of an example ball bearing actuator for moving a carrier of a camera, in accordance with some embodiments.

FIG. 2B illustrates a schematic side cross-sectional view of an example ball bearing actuator for moving a carrier of a camera, in accordance with some embodiments. In various embodiments, the ball bearing actuator may include any of the components shown. In some embodiments, another type of actuator may be used (e.g., a piezoelectric actuator, a comb drive actuator, etc.).

In embodiments, a ball bearing suspension arrangement of the ball bearing actuator may be configured to suspend a carrier (e.g., carrier 206) with an image sensor (e.g., image sensor 108) from a base structure (e.g., shield can 208) of the camera. This may allow the carrier to move on one or more of the ball bearings so as to allow motion in the z-directions (e.g., towards or away from the lens barrel) enabled by the ball bearing VCM actuator.

According to various embodiments, the actuator may include one or more coil(s) 210 that can electromagnetically interact (e.g., when electrical current is provided to the coil) with one or more magnets 212 to produce Lorentz forces that move the carrier, e.g., via controlled movement in directions allowed by the stages of the bearing suspension arrangement (e.g., towards or away from the lens barrel).

In some embodiments, the magnet 212 and the coil 210 may be positioned proximate one another so that they can electromagnetically interact with each other to shift the carrier with the image sensor (e.g., relative to the lens barrel) in the Z-axis direction, to provide AF movement of an image on the image sensor. While some aspects of the actuator may be referred to herein in terms of "AF," it should be understood that such aspects may additionally, or alternatively, be referred to in terms of "focus," in some embodiments.

In various embodiments, the camera and/or the bearing suspension arrangement(s) may include one or more ferritic components (e.g., formed of iron, stainless steel, etc.) that magnetically interact with one or more magnets to preload the ball bearings of the bearing suspension arrangement(s), e.g., in a load direction that is based at least in part on forces of attraction between the magnet(s) and the ferritic component(s). In embodiments, the preload force prevents the carrier from tilting towards or away from the lens barrel. This may avoid to need to place any additional structures in other locations of the camera to support the weight of the carrier and/or to hold the carrier in place (e.g., due to movement of the camera and/or due to gravity).

For example, a ferritic plate 214 may be positioned proximate the AF magnet 212 to preload the Z-translation ball bearings with a load in a direction orthogonal to the Z-axis direction (e.g., in the X-axis direction). For example, the plate 214 may be disposed between the coil 210 and an AF yoke 216. In embodiments, the camera 200 and/or the AF bearing suspension arrangement may include any number of ferritic components for preloading the Z-translation ball bearings. Additionally, or alternatively, one or more other magnets (not shown) may be included to magnetically interact with the ferritic component(s), to preload the Z-translation ball bearings 240 in some embodiments. The depicted example also includes a magnet yoke 218 and magnet holder 220 that hold the magnet in place.

In some embodiments, the camera may include a position sensor 222 that is fixedly coupled with the plate 214 (or coupled to any other component, in embodiments) and is proximate to the coil. In some embodiments, the position sensor may be a magnetic field sensor, such as a Hall sensor, tunneling magnetoresistance (TMR) sensor, giant magnetoresistance (GMR) sensor, etc. for position sensing with respect AF movement. The position sensor 222 may be used to detect magnetic field changes, e.g., as the position sensor 222 moves (together with the coil and carrier) in the Z-axis direction relative to the magnet 212. In some non-limiting examples, the position sensor 222 may be encircled by the coil 210.

Figure 3A:
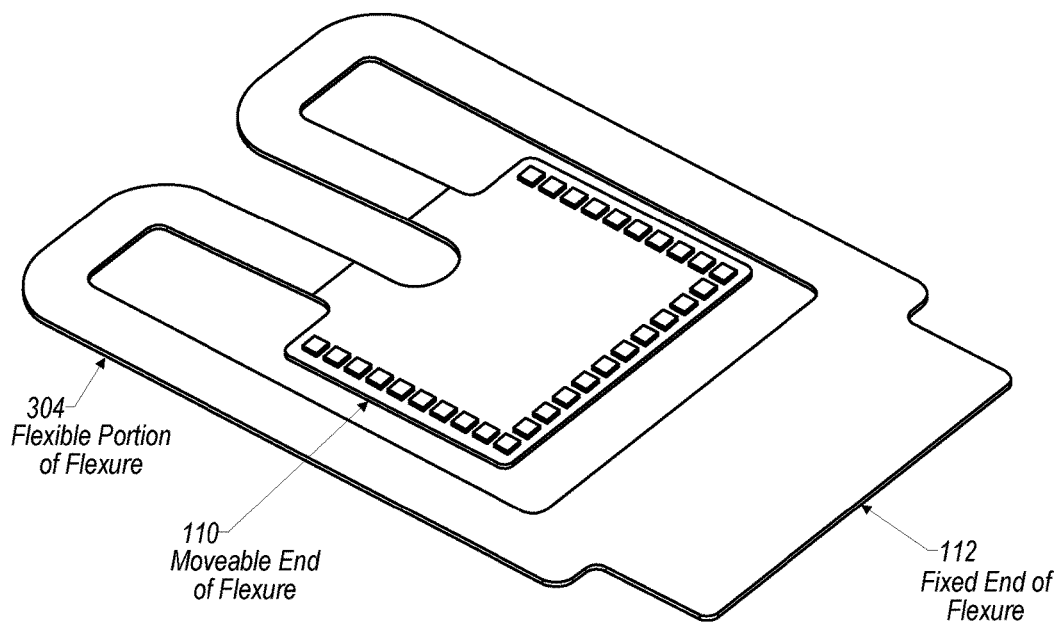
FIG. 3A shows a top perspective view of an example flexure that may be used to convey electrical signals to, from, and/or within a camera configured with a sensor shift actuator, in accordance with some embodiments.
Figure 3B:
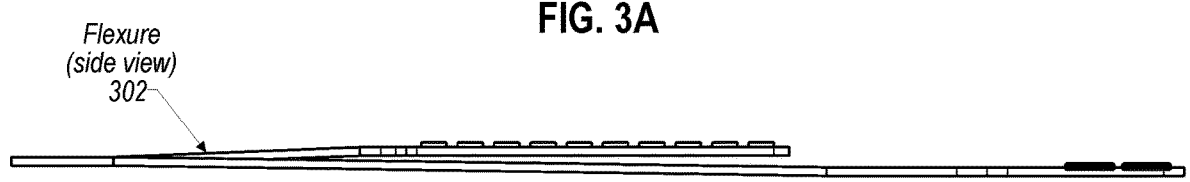
FIG. 3B shows a side perspective view of an example flexure that may be used to convey electrical signals to, from, and/or within a camera configured with a sensor shift actuator, in accordance with some embodiments.

FIG. 3A shows a top perspective view of an example flexure that may be used to convey electrical signals to, from, and/or within a camera configured with a sensor shift actuator (e.g., camera 100 in FIG. 1), in accordance with some embodiments. FIG. 3B shows a side perspective view of an example flexure 302 that may be used to convey electrical signals to, from, and/or within a camera configured with a sensor shift actuator, in accordance with some embodiments.

In various embodiments, the flexure may be configured to convey electrical signals between the carrier and/or the actuator and a base structure of the camera. As shown in FIG. 3A, the flexure includes a fixed end 112, a moveable end 110, and a flexible portion 304. The stationary flexure may extend along, or proximate to, one or more sides of the base structure (e.g., shield can or other structure). As indicated, the stationary flexure may include straight regions and one or more bend regions. In some embodiments, the flexure may extend, in directions orthogonal to an optical axis (e.g., optical axis 112 in FIG. 1), along inner and/or outer sides of the base structure.

In some embodiments, the flexure may be used to convey electrical signals from one or more components of the image sensor package/carrier and/or actuator, and/or vice-versa. In some non-limiting examples, power from a driver integrated circuit (which may be mounted to the flexure) may be conveyed to the coil via the flexure. For example, drive current may be conveyed from the flexure.

Figure 9:
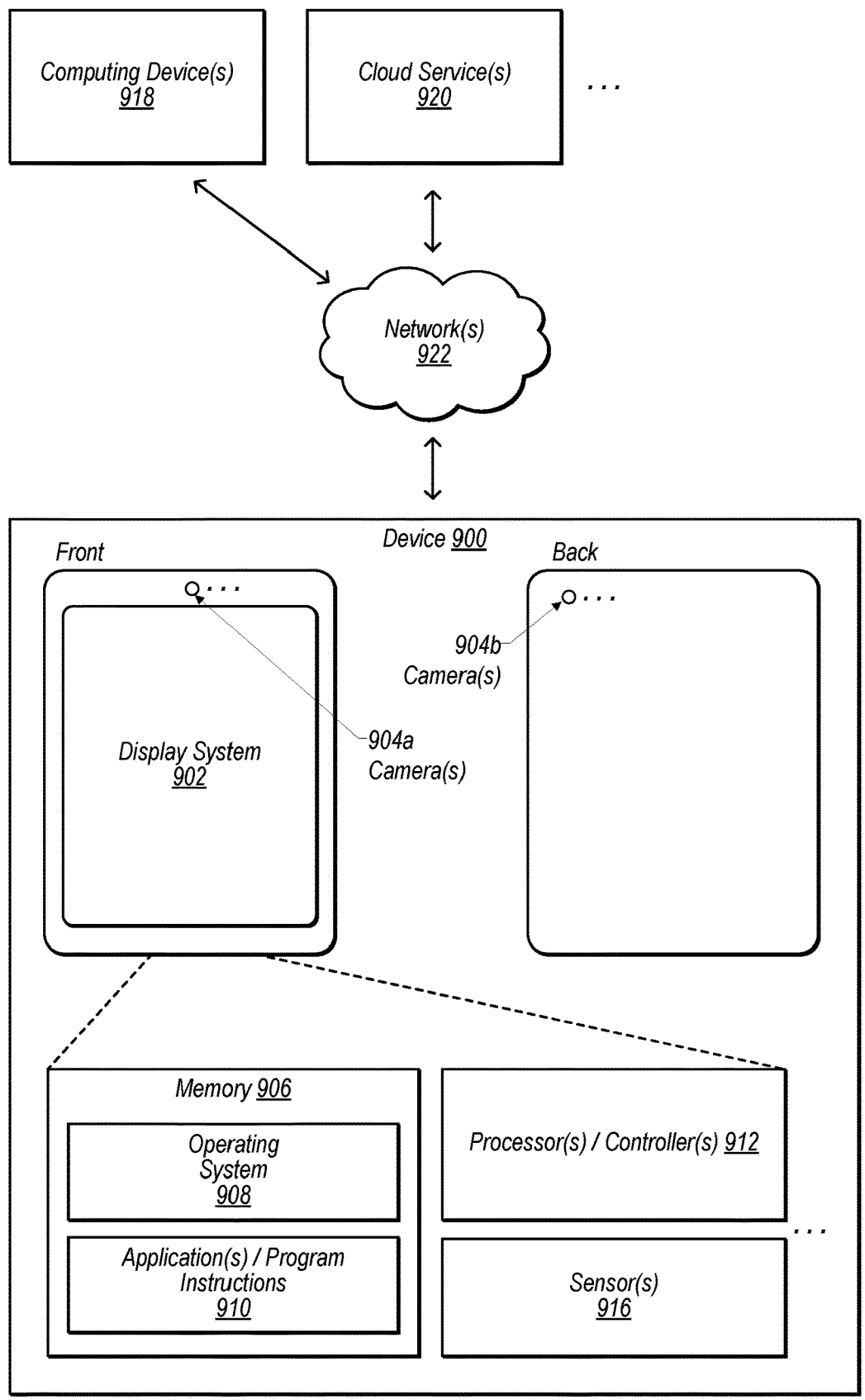
FIG. 9 illustrates a schematic representation of an example device that may include a camera having a ball bearing actuator for moving an image sensor and a flexure to supply a drive current to the ball bearing actuator, in accordance with some embodiments.
Figure 10:
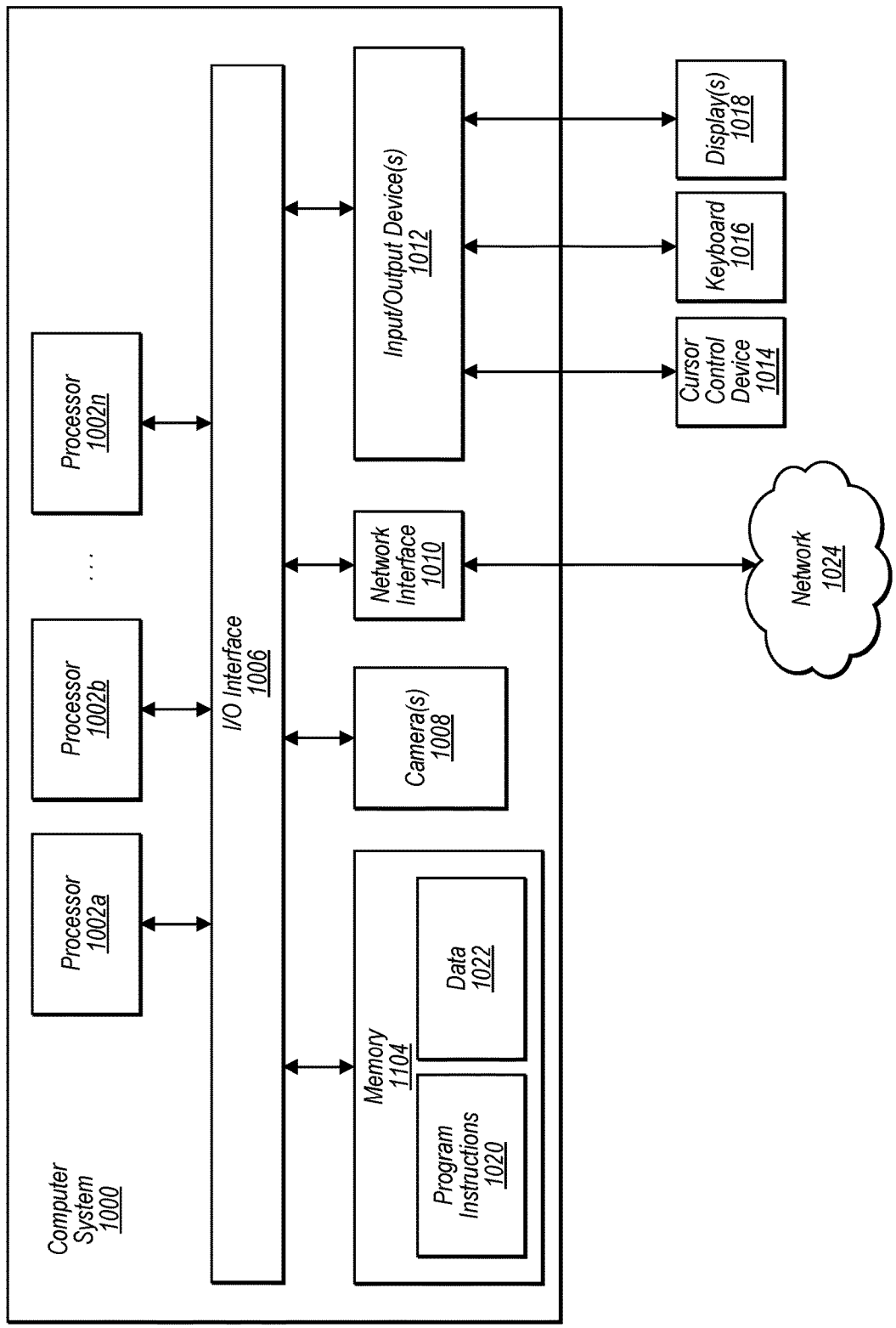
FIG. 10 illustrates a schematic block diagram of an example computer system that may include a camera having a ball bearing actuator for moving an image sensor and a flexure to supply a drive current to the ball bearing actuator, in accordance with some embodiments.

In some non-limiting examples, a portion of the flexure may exit the camera module, such that the flexure is configured to convey certain signals (e.g., signals associated with image data captured via the image sensor, signals associated with position sensor data captured via the position sensor(s), etc.) between the camera module and one or more components that are external to the camera, such as an image signal processor (ISP) of a device (e.g., the device 900 in FIG. 9, the computer system 1000 in FIG. 10, etc.). The flexure may be used to convey signals from the image sensor via a substrate (e.g., substrate in FIGS. 4A-4C) coupled with the image sensor and the flexure. Additionally, or alternatively, the flexure may be used to convey control signals (e.g., signals associated with actuator commands from controller(s) of the ISP) to the driver integrated circuit for driving the coil(s) of the actuator.

In some embodiments, the moveable end of the flexure may be attached to an underside of the image sensor package. For example, in some embodiments the moveable end may be attached to a bottom surface of the image sensor package, as indicated in FIG. 1. The flexible portion may extend from the fixed end portion to the moveable end portion. The flexible portion 260 be configured to allow the moveable end portion to move (e.g., with the image sensor) relative to the fixed end portion. In some embodiments, the camera may be configured to convey electrical signals (e.g., power and/or control signals) between the stationary structure and the image sensor package via the flexure.

In embodiments, the movable end portion of the flexure is coupled with a carrier. The carrier may include an image sensor and a coil of a ball bearing voice coil motor (VCM) actuator of the camera, wherein the ball bearing VCM actuator is enclosed by a shield can that is fixedly coupled with the lens barrel. As discussed herein, the coil may electromagnetically interact with a stationary magnet of the ball bearing VCM actuator, so as to produce forces that move the carrier, together with the image sensor and the coil, relative to the stationary structure and the lens barrel.

FIG. 4A illustrates a top perspective view of an example image sensor and substrate of a camera configured with a sensor shift actuator, in accordance with some embodiments.

In embodiments, an image sensor package may include an image sensor (e.g., image sensor 108) attached to a substrate 402. In various embodiments, the substrate may include one or more other electrical components. For example, the electrical component may include one or more driver integrated circuits (e.g., comprising a driver integrated circuit used for driving coil(s) of the actuator) and/or one or more position sensors, etc., mounted to or otherwise coupled with the flexure. In embodiments, the image sensor is attached to the substrate using wire bonding or using chip scale packaging.

FIG. 4B illustrates side perspective views and a top perspective view of an example substrate of a camera configured with a sensor shift actuator, in accordance with some embodiments.

In the depicted example, electrical components are embedded within the substrate 404. For example, a substrate 406 may include a silicon layer on top with a center core, which may include material that surrounds the components (e.g., epoxy or other material). The substrate 408 is another depicted example, which shows various components of different sizes and locations embedded within the substrate. In embodiments, embedding the components within the substrate may reduce the placement footprint of the substrate, compared to traditionally designed substrates. Furthermore, the embedding of the components within the substrate may be more light weight and/or may be more mechanically reliable, compared to traditionally designed substrates. For example, the components may be less likely to break or become dislodged due to an impact of the camera or a device containing the camera.

FIG. 4C illustrates a side perspective view and a top perspective view of an example substrate of a camera configured with a sensor shift actuator, in accordance with some embodiments.

In the depicted example, electrical components are embedded within a bottom cavity 410 of the substrate 412. The substrate 414 is another depicted example, which shows various components of different sizes and locations embedded within the bottom cavity of the substrate. In embodiments, the use of a substrate (e.g., ceramic substrate) with a bottom cavity may reduce the placement footprint of the substrate, compared to traditionally designed substrates.

Figure 5:
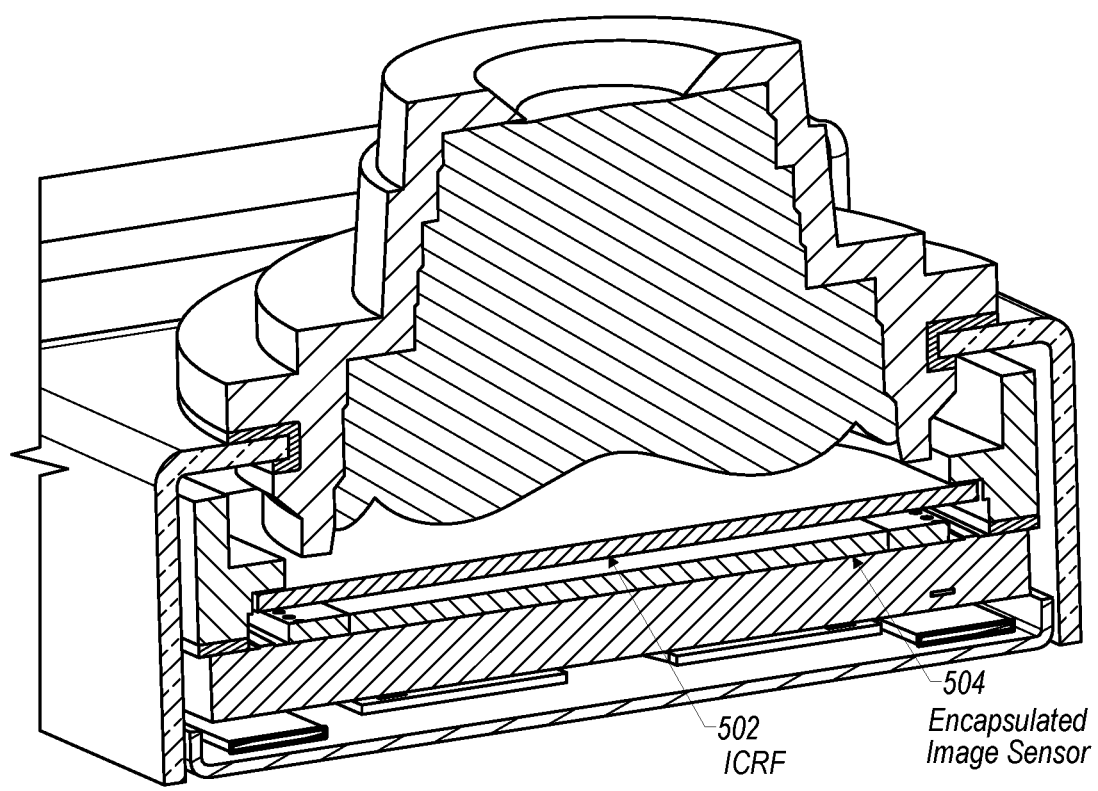
FIG. 5 illustrates a cross-sectional perspective view of an example camera having a ball bearing actuator for moving an encapsulated image sensor, in accordance with some embodiments.

FIG. 5 illustrates a cross-sectional perspective view of an example camera having a ball bearing actuator for moving an encapsulated image sensor, in accordance with some embodiments.

In the depicted example, an infrared cut-off filter (IRCF) 502 is located between the lens barrel/lens(es) and the image sensor 504. As shown, the IRCF is attached to the carrier to form a seal with the carrier to encapsulate the image sensor, such that one or more of particles and/or light is prevented from passing from outside the seal to the image sensor (or to the enclosed volume between the image sensor and the IRCF).

Figure 6:
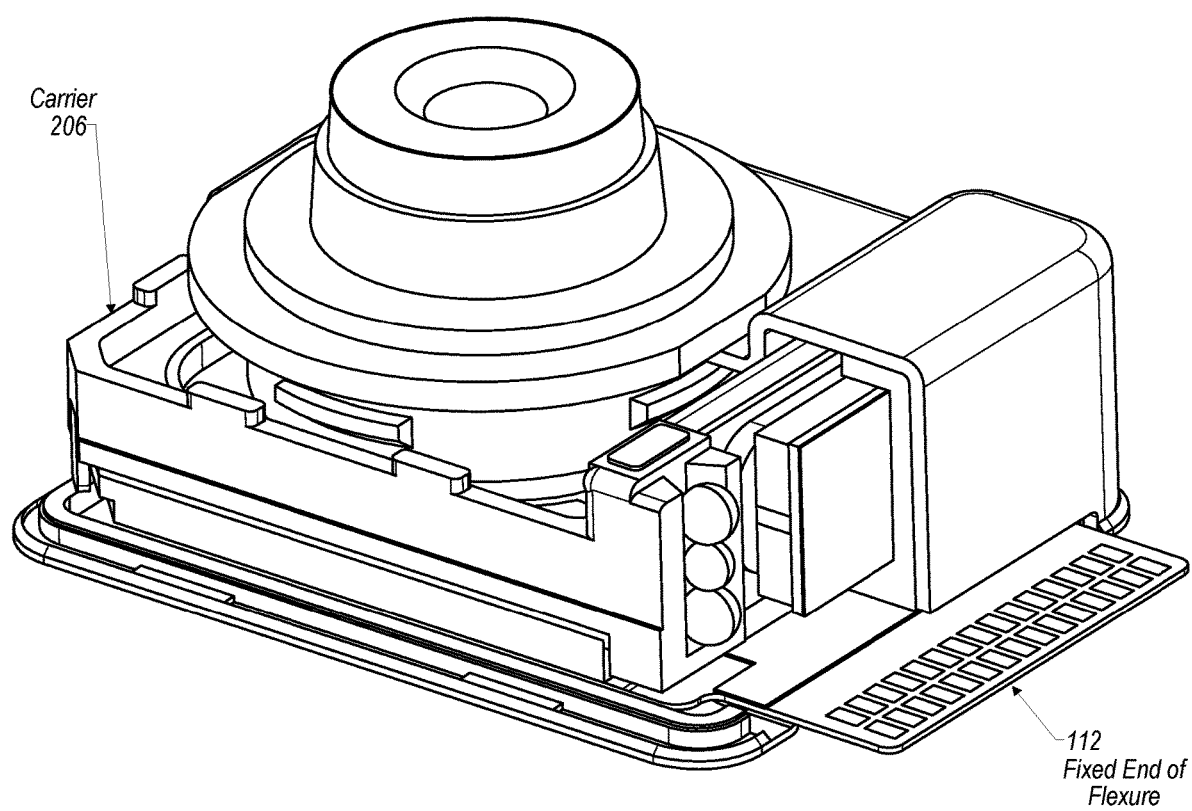
FIG. 6 illustrates a cross-sectional perspective view of an example camera having a ball bearing actuator for moving a carrier and a flexure to supply a drive current to the ball bearing actuator, in accordance with some embodiments.

FIG. 6 illustrates a cross-sectional perspective view of an example camera having a ball bearing actuator for moving a carrier and a flexure to supply a drive current to the ball bearing actuator, in accordance with some embodiments.

As depicted, the camera includes a carrier 206 that moves an image sensor using a ball bearing VCM actuator. In the depicted example, a fixed end of the flexure 112 protrudes from the camera, such that electrical contacts of the flexure are exposed. This may allow the protruding end of the flexure to interface with another device and form an electrical connection to perform various functions, as discussed above (e.g., via insertion of the fixed end of the flexure into another device).

Figure 7:
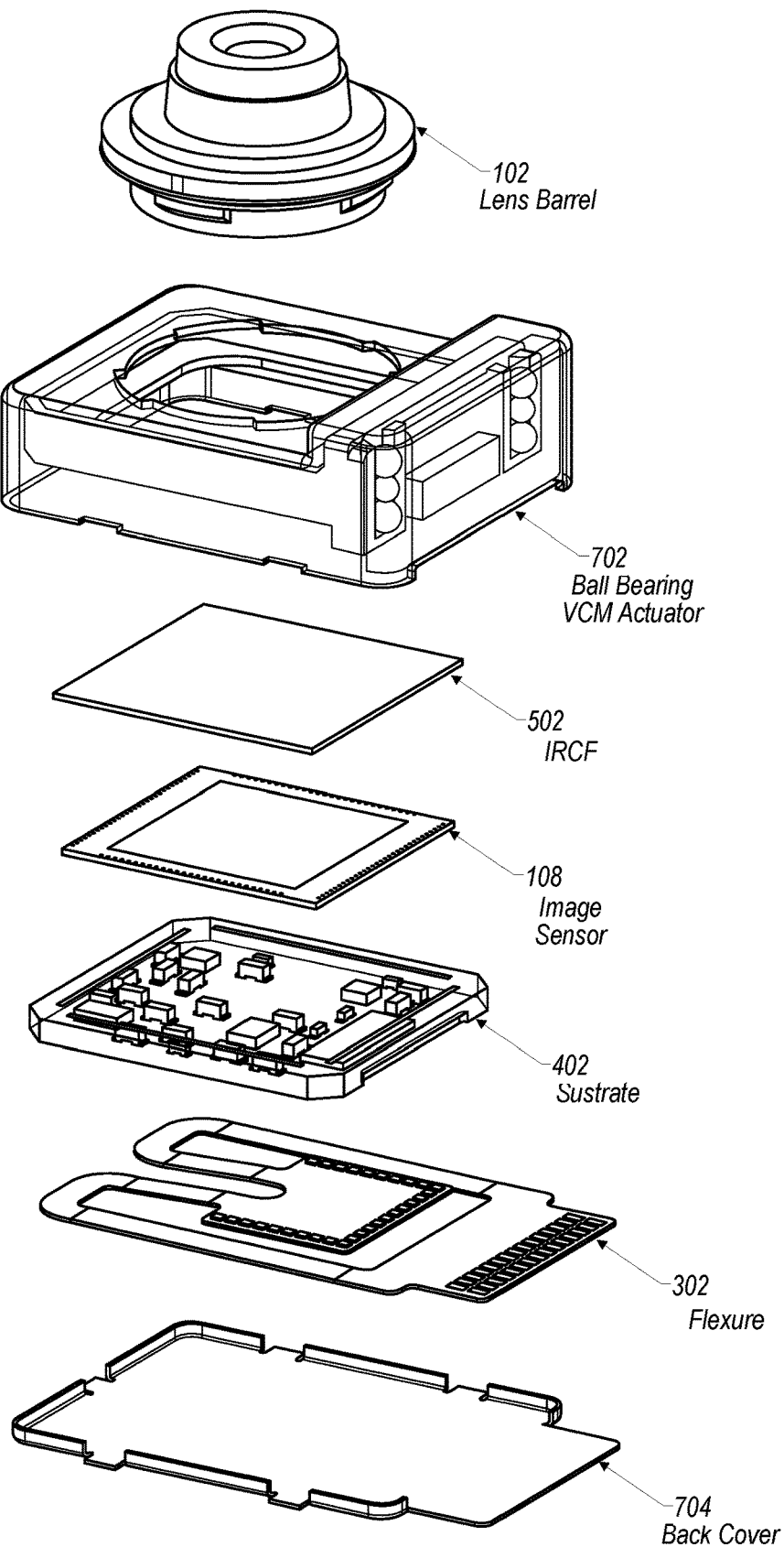
FIG. 7 illustrates a top perspective exploded view of an example camera having a ball bearing actuator for moving an image sensor and a flexure to supply a drive current to the ball bearing actuator, in accordance with some embodiments, in accordance with some embodiments.

FIG. 7 illustrates a top perspective exploded view of an example camera having a ball bearing actuator for moving an image sensor and a flexure to supply a drive current to the ball bearing actuator, in accordance with some embodiments, in accordance with some embodiments.

The depicted example camera include a lens barrel 102 that includes at least one lens. The camera may also include a shield can that is fixedly coupled with the lens barrel. The camera also includes an image sensor 108 to capture image data based on light that has passed through the at least one lens. In embodiments, the carrier 206 is fixedly coupled with the image sensor.

The ball bearing VCM actuator 702 may move the image sensor relative to the lens barrel. In embodiments, a side of the shield can that encloses the ball bearing VCM actuator 702 extends further away from the camera barrel than an opposite side of the shield can (e.g., creating an asymmetrically shaped camera).

The ball bearing VCM actuator 702 may include a coil fixedly coupled with the carrier, such that the coil moves together with the carrier, a magnet fixedly coupled with the shield can (e.g., by being attached to the shield can or being attached to another structure that is attached to the shield can directly or through one or more other structures), and a bearing suspension arrangement (e.g., ball bearing VCM actuator) to suspend the carrier from the shield can, wherein the carrier is configured to move on ball bearings so as to allow motion enabled by the ball bearing VCM actuator.

In embodiments, the flexure 302 provides an electrical connection between the carrier and a stationary structure of the camera, wherein a flexible portion of the flexure allows motion of the carrier relative to the stationary structure enabled by the ball bearing VCM actuator while maintaining the electrical connection. The flexure conveys electrical signals between the carrier and the stationary structure via the electrical connection. The example camera also includes a back cover 704. A moveable end of the flexure may be attached to the substrate. Also shown is an IRCF 502, which may be placed above the image sensor.

FIG. 8A illustrates a schematic top cross-sectional view of an example bearing suspension arrangement having a first group of raceways directionally biased inwards and a second group of raceways directionally biased outwards, in accordance with some embodiments.

In the depicted example, a bearing suspension arrangement includes a first group of raceways (V1, V2, and U) enclosing a first group of the ball bearings and a second group of raceways (V3, V4, V5, and V6) enclosing a second group of the ball bearings, wherein the first group of raceways is located approximately at a first corner of the carrier 802, and wherein the second group of raceways is located approximately at a second corner of the carrier 802 that is adjacent to the first corner of the carrier (e.g., as in FIG. 2A).

As shown, raceways V1, V2, V3, and V4 are on the carrier and raceways U, V5, and V6 are on the base 804 (e.g., the shield can or other stationary structure attached to the shield can directly or indirectly). The arrows extending from each raceway indicate a direction that each raceway is leaning/titling/angled (e.g., the directional bias), from the bottom upwards along the z-axis. As shown (also depicted in FIG. 8B), the left raceways lean inwards (directionally biased inwards) and the right raceways lean outwards (directionally biased outwards). In some embodiments, the raceways on the base (raceways U, V5, and V6) do not lean in either direction (e.g., they are not directionally biased).

In some embodiments, the directional bias of some or all of the raceways, as described herein, may prevent or reduce unwanted shifting (e.g., rocking, titling) of the carrier during movement, in order to avoid reduced captured image quality due to the shifting or rocking. In raceways that are unbiased, shifting may occur during movement of the carrier, due to any number of factors, such as raceway deformation, differences in size or placement of ball bearings, etc.). For example, the carrier may be in contact with three of the large ball bearings at a lower height (e.g., ball bearings A, B, C of FIG. 2A), but change to be in contact with a different combination of three of the large ball bearings at a higher height (e.g., ball bearings A, B, D of FIG. 2A). Without using raceways with directional bias, changing/transitioning of the current combination of contacting ball bearings during movement of the carrier may result in the unwanted shifting or rocking of the carrier.

In some embodiments, the directional bias of some or all of the raceways may may prevent or reduce unwanted shifting or rocking of the carrier during movement by causing the combination of contacting ball bearings to remain the same during movement (e.g., ball bearings A, B, C of FIG. 2A may remain in contact during movement, without any contact with ball bearing C). In some embodiments, the directional bias of some or all of the raceways may also reduce or eliminate the need to use one or more plates and/or one or more magnets to generate the preload force (e.g., no preload force or a smaller preload force may be used when some or all of the raceways are directionally biased).

Figure 8B:
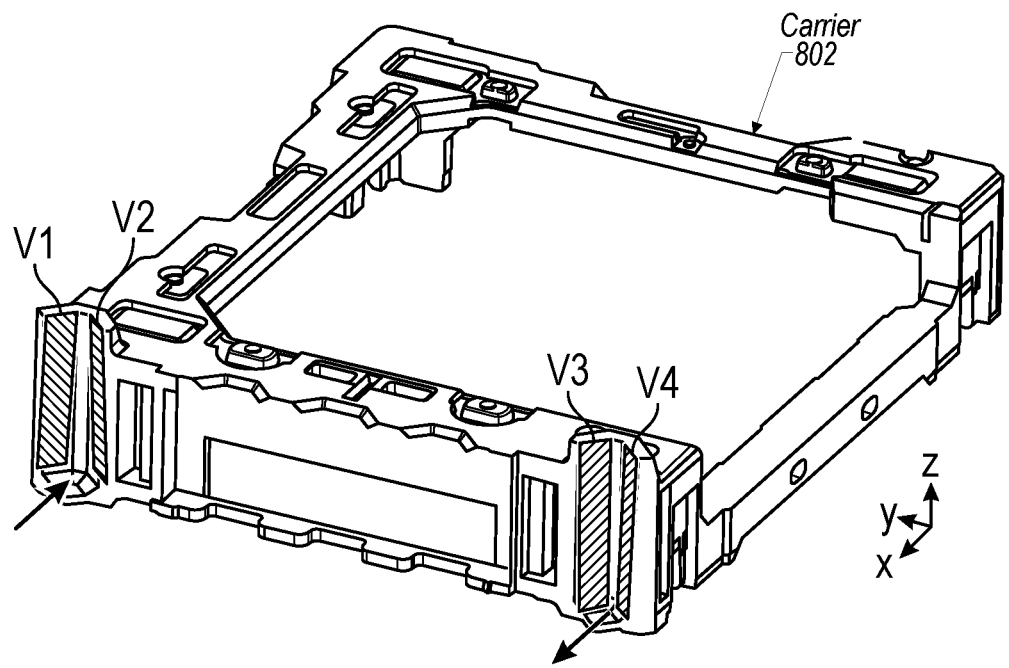
FIG. 8B shows a top perspective view of a carrier of a camera having a first group of raceways directionally biased inwards and a second group of raceways directionally biased outwards, in accordance with some embodiments.

FIG. 8B shows a top perspective view of a carrier of a camera having a first group of raceways directionally biased inwards and a second group of raceways directionally biased outwards, in accordance with some embodiments.

As shown, raceways V1 and V2 lean inwards (directionally biased inwards) and raceways V3 and V4 lean outwards (directionally biased outwards). In embodiments, a first group of raceways (the group V1 and V2, or the group V1, V2, and U) are directionally biased inwards by at least a threshold amount (e.g., at least a threshold distance of leaning along the x-axis, measured from the bottom to the top of the raceway/track or at least a threshold angle of inward leaning from the z-axis) and a second group of raceways (the group V3 and V4, or the group V3, V4, V5, and V6) are directionally biased outwards by at least another threshold amount (e.g., at least a threshold distance of leaning along the x-axis, measured from the bottom to the top of the raceway/track or at least a threshold angle of outward leaning from the z-axis).

In some embodiments, a first group of raceways (the group V1 and V2, or the group V1, V2, and U) are directionally biased inwards by at least a threshold minimum amount but less than a threshold maximum amount (e.g., between the minimum and maximum threshold distance of inward leaning along the x-axis or between a minimum and maximum threshold angle of inward leaning from the z-axis) and a second group of raceways (the group V3 and V4, or the group V3, V4, V5, and V6) are directionally biased outwards by at least a threshold minimum amount but less than a threshold maximum amount (e.g., between the minimum and maximum threshold distance of outward leaning along the x-axis or between a minimum and maximum threshold angle of outward leaning from the z-axis). The above are examples of how the threshold amount of directional bias inwards and outwards may be measured; therefore, in various embodiments, any other suitable techniques may be used to quantify/measure the amount of directional bias inwards and outwards of a given raceway/track.

FIG. 9 illustrates a schematic representation of an example device 900 that may include a camera (e.g., camera 100 in FIG. 1A, etc.) having a ball bearing actuator for moving an image sensor and a flexure to supply a drive current to the ball bearing actuator, in accordance with some embodiments. In some embodiments, processor(s) of the device 900 (or system 1000) may cause the camera to perform any of the functions or actions described herein for the camera. For example, one or more processors of the device or system may cause the ball bearing VCM actuator to move the carrier in at least one direction parallel to an optical axis defined by the at least one lens.

In some embodiments, the device 900 may be a mobile device and/or a multifunction device. In various embodiments, the device 900 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 900 may include a display system 902 (e.g., comprising a display and/or a touch-sensitive surface) and/or one or more cameras 904. In some non-limiting embodiments, the display system 902 and/or one or more front-facing cameras 904a may be provided at a front side of the device 900, e.g., as indicated in FIG. 9. Additionally, or alternatively, one or more rear-facing cameras 904b may be provided at a rear side of the device 900. In some embodiments comprising multiple cameras 904, some or all of the cameras may be the same as, or similar to, each other. Additionally, or alternatively, some or all of the cameras may be different from each other. In various embodiments, the location(s) and/or arrangement(s) of the camera(s) 904 may be different than those indicated in FIG. 9.

Among other things, the device 900 may include memory 906 (e.g., comprising an operating system 908 and/or application(s)/program instructions 910), one or more processors and/or controllers 912 (e.g., comprising CPU(s), memory controller(s), display controller(s), and/or camera controller(s), etc.), and/or one or more sensors 916 (e.g., orientation sensor(s), proximity sensor(s), and/or position sensor(s), etc.). In some embodiments, the device 900 may communicate with one or more other devices and/or services, such as computing device(s) 918, cloud service(s) 920, etc., via one or more networks 922. For example, the device 900 may include a network interface (e.g., network interface 1110 in FIG. 11) that enables the device 900 to transmit data to, and receive data from, the network(s) 922. Additionally, or alternatively, the device 900 may be capable of communicating with other devices via wireless communication using any of a variety of communications standards, protocols, and/or technologies.

FIG. 10 illustrates a schematic block diagram of an example computing device, referred to as computer system 1000, that may include or host embodiments of a camera having a ball bearing actuator for moving an image sensor and a flexure to supply a drive current to the ball bearing actuator, e.g., as described herein with reference to FIGS. 1-9. In addition, computer system 1000 may implement methods for controlling operations of the camera and/or for performing image processing images captured with the camera. In some embodiments, the device 900 (described herein with reference to FIG. 9) may additionally, or alternatively, include some or all of the functional components of the computer system 1000 described herein.

The computer system 1000 may be configured to execute any or all of the embodiments described above. In different embodiments, computer system 1000 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 1000 includes one or more processors 1002 coupled to a system memory 1004 via an input/output (I/O) interface 1006. Computer system 1000 further includes one or more cameras 1008 coupled to the I/O interface 1006. Computer system 1000 further includes a network interface 1010 coupled to I/O interface 1006, and one or more input/output devices 1012, such as cursor control device 1014, keyboard 1016, and display(s) 1018. In some cases, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1002, or a multiprocessor system including several processors 1002 (e.g., two, four, eight, or another suitable number). Processors 1002 may be any suitable processor capable of executing instructions. For example, in various embodiments processors 1002 may be general-purpose or embedded processors implementing any of a variety of instruction set architectures (ISAs), such as the x86, PowerPC, SPARC, or MIPS ISAs, or any other suitable ISA. In multiprocessor systems, each of processors 1002 may commonly, but not necessarily, implement the same ISA.

System memory 1004 may be configured to store program instructions 1020 accessible by processor 1002. In various embodiments, system memory 1004 may be implemented using any suitable memory technology, such as static random access memory (SRAM), synchronous dynamic RAM (SDRAM), nonvolatile/Flash-type memory, or any other type of memory. Additionally, existing camera control data 1022 of memory 1004 may include any of the information or data structures described above. In some embodiments, program instructions 1020 and/or data 1022 may be received, sent or stored upon different types of computer-accessible media or on similar media separate from system memory 1004 or computer system 1000. In various embodiments, some or all of the functionality described herein may be implemented via such a computer system 1000.

In one embodiment, I/O interface 1006 may be configured to coordinate I/O traffic between processor 1002, system memory 1004, and any peripheral devices in the device, including network interface 1010 or other peripheral interfaces, such as input/output devices 1012. In some embodiments, I/O interface 1006 may perform any necessary protocol, timing or other data transformations to convert data signals from one component (e.g., system memory 1004) into a format suitable for use by another component (e.g., processor 1002). In some embodiments, I/O interface 1006 may include support for devices attached through various types of peripheral buses, such as a variant of the Peripheral Component Interconnect (PCI) bus standard or the Universal Serial Bus (USB) standard, for example. In some embodiments, the function of I/O interface 1006 may be split into two or more separate components, such as a north bridge and a south bridge, for example. Also, in some embodiments some or all of the functionality of I/O interface 1006, such as an interface to system memory 1004, may be incorporated directly into processor 1002.

Network interface 1010 may be configured to allow data to be exchanged between computer system 1000 and other devices attached to a network 1024 (e.g., carrier or agent devices) or between nodes of computer system 1000. Network 1024 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1010 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1012 may, in some embodiments, include one or more display terminals, keyboards, keypads, touchpads, scanning devices, voice or optical recognition devices, or any other devices suitable for entering or accessing data by one or more computer systems 1000. Multiple input/output devices 1012 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1010.

Those skilled in the art will appreciate that computer system 1000 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
   a lens barrel comprising at least one lens;
   a shield can fixedly coupled with the lens barrel;
   an image sensor to capture image data based on light that has passed through the at least one lens;
   a carrier fixedly coupled with the image sensor;
   a ball bearing voice coil motor (VCM) actuator to move the image sensor relative to the lens barrel, wherein a side of the shield can that encloses the ball bearing VCM actuator extends further away from the camera barrel than an opposite side of the shield can, the ball bearing VCM actuator comprising:
      a coil fixedly coupled with the carrier, such that the coil moves together with the carrier;
      a magnet fixedly coupled with the shield can; and
      a bearing suspension arrangement to suspend the carrier from the shield can, wherein the carrier is configured to move on ball bearings so as to allow motion enabled by the ball bearing VCM actuator; and
   a flexure that provides an electrical connection between the carrier and a stationary structure of the camera, wherein a flexible portion of the flexure allows motion of the carrier relative to the stationary structure enabled by the ball bearing VCM actuator while maintaining the electrical connection, and wherein the flexure conveys electrical signals between the carrier and the stationary structure via the electrical connection.

2. The camera of claim 1, wherein the flexure comprises:
   a fixed end portion fixedly coupled with the stationary structure;
   a movable end portion fixedly coupled with the carrier; and
   the flexible portion that extends from the fixed end portion to the movable end portion.

3. The camera of claim 1, wherein the bearing suspension arrangement comprises a first group of raceways enclosing a first group of the ball bearings and a second group of raceways enclosing a second group of the ball bearings, wherein the first group of raceways is located approximately at a first corner of the carrier, and wherein the second group of raceways is located approximately at a second corner of the carrier that is adjacent to the first corner of the carrier.

4. The camera of claim 3, wherein a plurality of the first group of raceways are directionally biased inwards by at least a threshold amount and a plurality of the second group of raceways are directionally biased outwards by at least another threshold amount.

5. The camera of claim 1, wherein the ball bearing VCM actuator further comprises a plate fixedly coupled with the carrier that magnetically interacts with the magnet to preload the ball bearings, wherein the preload prevents the carrier from tilting towards or away from the lens barrel.

6. The camera of claim 1, wherein the shield can forms a seal with the lens barrel such one or more of particles or light are prevented from passing from outside the seal into the camera.

7. The camera of claim 1, wherein the camera further comprises an infrared cut-off filter between the lens barrel and the image sensor, and wherein the infrared cut-off filter is attached to the carrier to form a seal with the carrier such that one or more of particles or light are prevented from passing from outside the seal to the image sensor.

8. A device, comprising:
   one or more processors;
   memory storing program instructions executable by the one or more processors to control operation of a camera; and
   the camera, comprising:
      a lens barrel comprising at least one lens;
      a shield can fixedly coupled with the lens barrel;
      an image sensor to capture image data based on light that has passed through the at least one lens;
      a carrier fixedly coupled with the image sensor;
      a ball bearing voice coil motor (VCM) actuator to move the image sensor relative to the lens barrel, wherein a side of the shield can that encloses the ball bearing VCM actuator extends further away from the camera barrel than an opposite side of the shield can, the ball bearing VCM actuator comprising:
         a coil fixedly coupled with the carrier, such that the coil moves together with the carrier;
         a magnet fixedly coupled with the shield can; and
         a bearing suspension arrangement to suspend the carrier from the shield can, wherein the carrier is configured to move on ball bearings so as to allow motion enabled by the ball bearing VCM actuator; and a flexure that provides an electrical connection between the carrier and a stationary structure of the camera, wherein a flexible portion of the flexure allows motion of the carrier relative to the stationary structure enabled by the ball bearing VCM actuator while maintaining the electrical connection, and wherein the flexure conveys electrical signals between the carrier and the stationary structure via the electrical connection.

9. The device of claim 8, wherein the flexure comprises:
a fixed end portion fixedly coupled with the stationary structure;
a movable end portion fixedly coupled with the carrier; and
the flexible portion that extends from the fixed end portion to the movable end portion.

10. The device of claim 8, wherein the bearing suspension arrangement comprises a first group of raceways enclosing a first group of the ball bearings and a second group of raceways enclosing a second group of the ball bearings, wherein the first group of raceways is located approximately at a first corner of the carrier, and wherein the second group of raceways is located approximately at a second corner of the carrier that is adjacent to the first corner of the carrier.

11. The device of claim 10, wherein a plurality of the first group of raceways are directionally biased inwards by at least a threshold amount and a plurality of the second group of raceways are directionally biased outwards by at least another threshold amount.

12. The device of claim 8, wherein the ball bearing VCM actuator further comprises a plate fixedly coupled with the carrier that magnetically interacts with the magnet to preload the ball bearings, wherein the preload prevents the carrier from tilting towards or away from the lens barrel.

13. The device of claim 8, wherein the shield can forms a seal with the lens barrel such one or more of particles or light are prevented from passing from outside the seal into the camera.

14. The device of claim 8, wherein the camera further comprises an infrared cut-off filter between the lens barrel and the image sensor, and wherein the infrared cut-off filter is attached to the carrier to form a seal with the carrier such that one or more of particles or light are prevented from passing from outside the seal to the image sensor.

15. The device of claim 8, wherein the one or more processors are configured to cause the ball bearing VCM actuator to move the carrier in at least one direction parallel to an optical axis defined by the at least one lens.

16. A flexure for a camera, the flexure comprising:
a fixed end portion fixedly coupled with a stationary structure of the camera;
a movable end portion coupled with a carrier comprising an image sensor and a coil of a ball bearing voice coil motor (VCM) actuator of the camera, wherein the ball bearing VCM actuator is enclosed by a shield can that is fixedly coupled with a lens barrel, wherein the coil is to electromagnetically interact with a stationary magnet of the ball bearing VCM actuator, so as to produce forces that move the carrier, together with the image sensor and the coil, relative to the stationary structure and the lens barrel; and
a flexible portion to convey electrical signals between the fixed end portion and the movable end portion, wherein the flexible portion allows motion of the carrier relative to the stationary structure enabled by the ball bearing VCM actuator while maintaining the electrical connection.

17. The flexure of claim 16, wherein the movable end portion is electrically connected with the coil such that the electrical signals are capable of supplying a drive current to the coil.

18. The flexure of claim 16, wherein the ball bearing VCM actuator comprises the coil, the stationary magnet fixedly coupled with the shield can, and a bearing suspension arrangement to suspend the carrier from the shield can, wherein the carrier is configured to move on ball bearings so as to allow motion enabled by the ball bearing VCM actuator, and wherein the bearing suspension arrangement comprises a first group of raceways enclosing a first group of the ball bearings and a second group of raceways enclosing a second group of the ball bearings.

19. The flexure of claim 18, wherein a plurality of the first group of raceways are directionally biased inwards by at least a threshold amount and a plurality of the second group of raceways are directionally biased outwards by at least another threshold amount.

20. The flexure of claim 16, wherein the image sensor is attached to a substrate, wherein the substrate comprises electrical components embedded within the substrate or placed within a cavity of the substrate.

* * * * *